Figure 1:
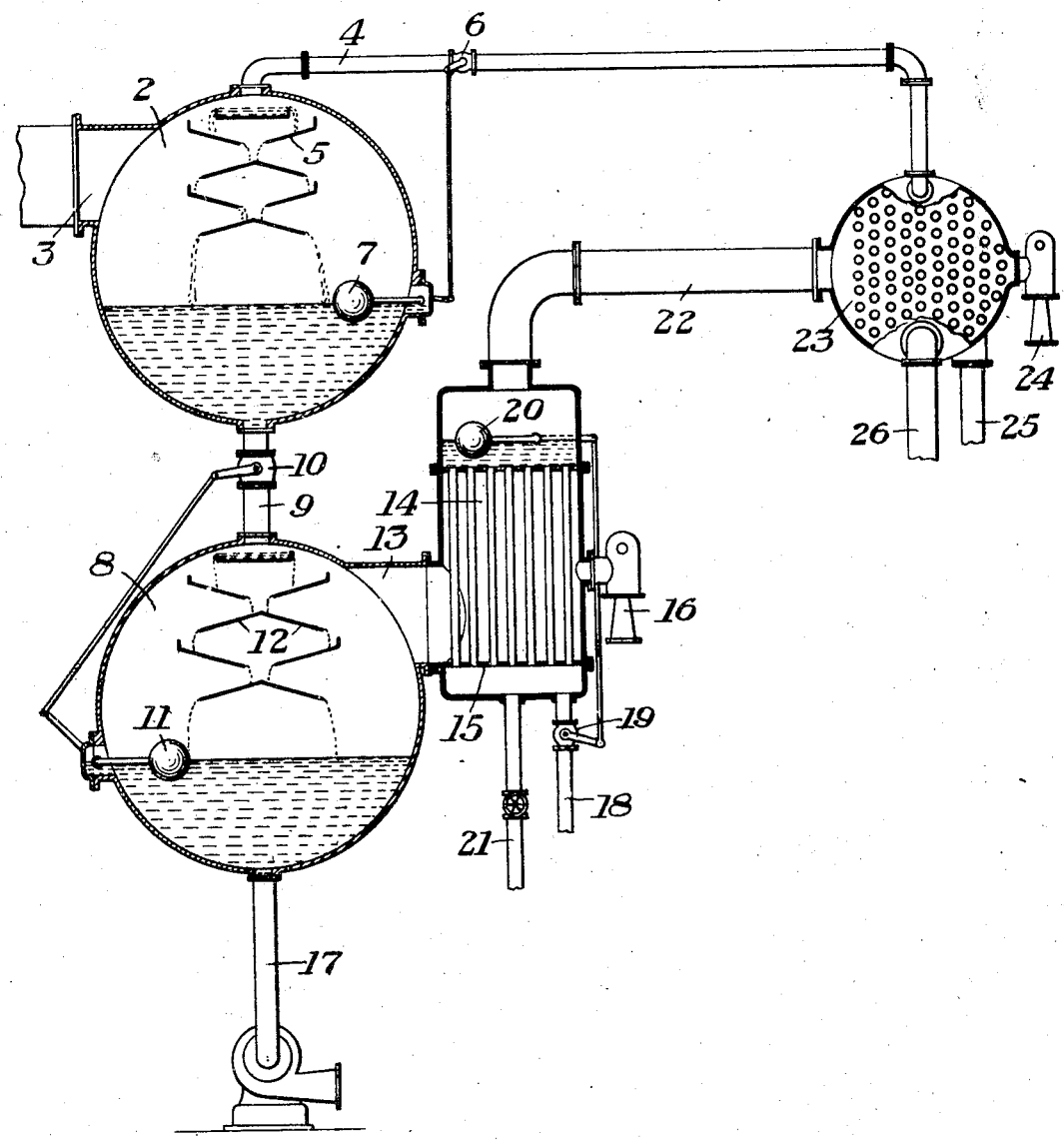

May 13, 1930. W. S. ELLIOTT 1,758,566
METHOD AND APPARATUS FOR DEAERATING AND EVAPORATING LIQUID
Filed March 27, 1923 2 Sheets-Sheet 1

INVENTOR

Patented May 13, 1930

1,758,556

UNITED STATES PATENT OFFICE

WILLIAM S. ELLIOTT, OF PITTSBURGH, PENNSYLVANIA

METHOD AND APPARATUS FOR DEAERATING AND EVAPORATING LIQUID

Application filed March 27, 1923. Serial No. 628,150.

The present invention relates broadly to liquid treating and heat exchanging apparatus, and more particularly to apparatus of this character adapted for the evaporation of a portion of the liquid for the production of distilled water, and for the deaeration of the remaining portion of the liquid for the production of substantially air-free water.

In my prior reissue Patent No. 15,846 of June 24, 1924 there is disclosed broadly a method of producing air-free liquid by producing a change of phase of the liquid being treated to an extent sufficient to release substantially all of the air contained therein, and more particularly passing liquid into a receiver at a definitely higher temperature than the temperature corresponding to the pressure in the receiver, whereby the liquid is caused to violently flash or boil at the expense of its contained heat. This produces the evaporation within the receiver of a certain percentage of the total amount of liquid being treated, and the vapors so released are condensed and the heat thereof imparted to the liquid to be treated prior to its admission into the receiver. It has been found that the evaporation of such a percentage of the liquid under these conditions effectively releases all of the dissolved air whereby air-free water may be drawn from the receiver to a point of use.

Preferably the liquid to be treated is passed through a heater in which definite temperature conditions are maintained and the receiver is provided with a condenser having an ejector on the outlet thereof whereby definite temperature and pressure conditions materially lower than those in the heater can be continuously maintained in the receiver. Also this condenser effectively condenses the released vapors, while the ejector insures removal from the condenser and receiver of the noncondensible gases.

In accordance with the present invention, there may be utilized an apparatus and method of operation as disclosed in my patent referred to, but in addition there is provided supplemental means co-operating with the condenser for maintaining in the liquid space thereof a definitely lower temperature than the temperature in the receiver, whereby the heat released in the receiver will in turn be effective for evaporating a portion of the condenser liquid in said condenser. The vapors so released will, in turn, be condensed by said supplemental means thereby securing distilled water.

In the accompanying drawings there are shown, for purposes of illustration only, two forms of apparatus embodying the present invention. It will be understood that these drawings are largely diagrammatic and that they do not define the limits of my invention as changes in the construction and operation herein disclosed may obviously be made without departing from the spirit of my invention or scope of my broader claims.

Figure 2:
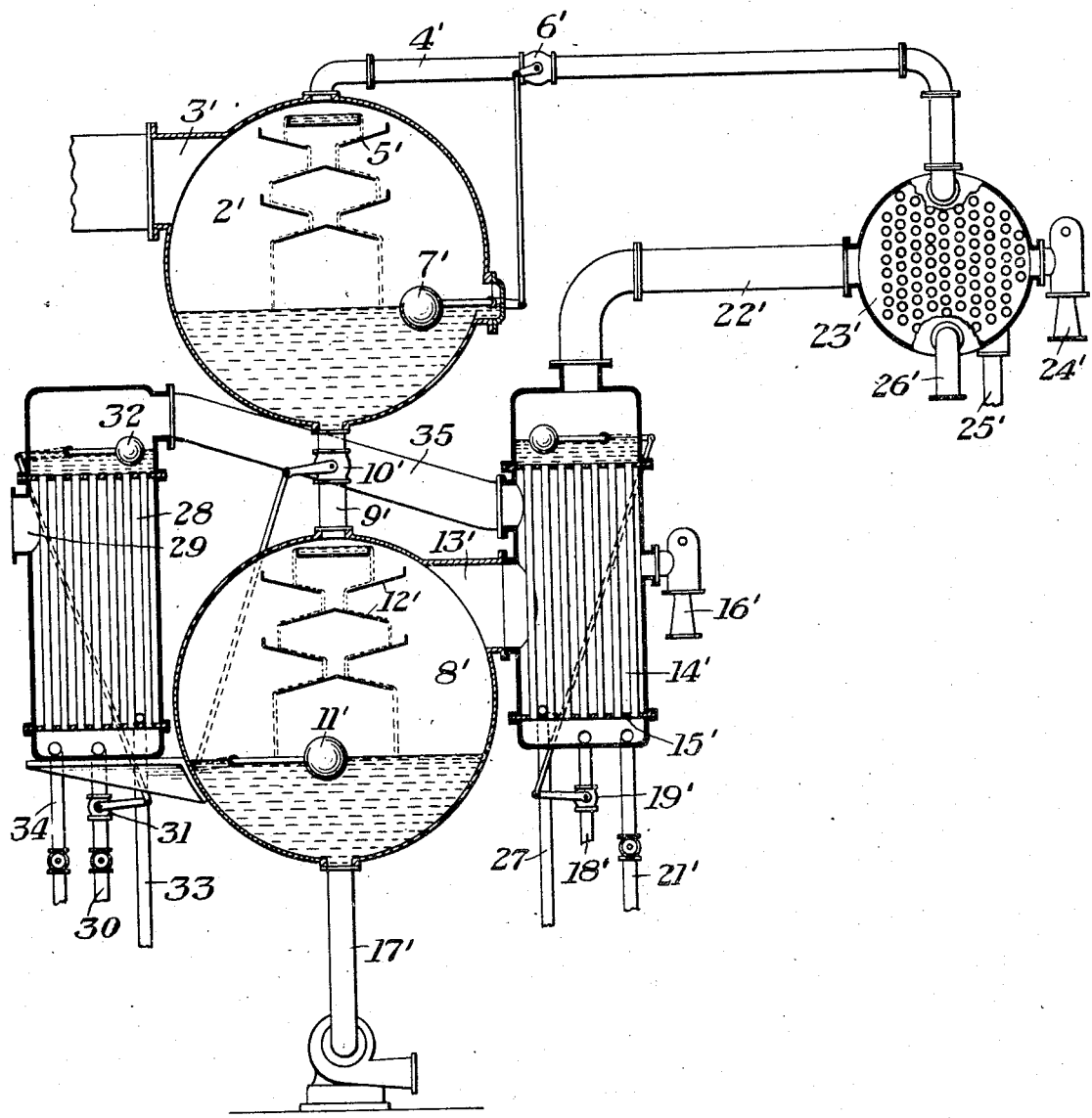

In the drawings:

Figure 1 is a diagrammatic view, partly in section and partly broken away, illustrating one form of deaerating and evaporating apparatus constructed in accordance with the present invention, and Figure 2 is a similar view illustrating a slightly modified form of apparatus.

Referring first to that form of my invention shown in Figure 1, there may be provided a heater 2 having a connection 3 constituting a source of heat such as steam. In accordance with power plant practice, this steam inlet connection may be thermostatically controlled whereby the temperature conditions within the heater may be automatically maintained as required, or it may be manually controlled for the same purpose. For supplying liquid to the heater 2 there is an inlet connection 4 adapted to initially discharge the liquid into the vapor space of the heater through which it flows in cascade over a series of agitating and breaking-up pans 5, whereby the efficient interchange of heat is insured. The admission of liquid to the heater may be automatically controlled by a float-operated valve 6 in the connection 4 which is automatically operated by a float 7 in the heater. This heater constitutes a temperature stage.

Adapted to receive heated liquid from the heater 2 is a receiver or evaporating chamber 8 having a connection 9 with the liquid space of the heater. The flow of heated liquid though this connection may be automatically controlled independently of the temperature and pressure conditions within the receiver or evaporating chamber by means of a float-operated valve 10 controlled by a float 11 in the evaporating chamber. In this manner the supply of heated liquid to the evaporating chamber is definitely controlled in accordance with the rapidity with which liquid is in turn withdrawn from the evaporating chamber. This connection between the heater and the evaporator is also such as to insure a constant sealing thereof by the liquid in the heater whereby temperature and pressure conditions of different character may be independently maintained in the heater and the evaporating chamber. This receiver or evaporating chamber constitutes a pressure stage.

As clearly disclosed in my patent, if the liquid is supplied from the heater 2 to the evaporating chamber in superheated condition relatively thereto, or in other words at a definitely higher temperature than the temperature corresponding to the pressure in the evaporating chamber, the entering liquid will be caused to violently flash or boil within the evaporating chamber, thereby effectively releasing its dissolved air. This release of the air may be further expedited by passing the liquid in finely broken up condition in cascade over a series of agitating or distributing pans 12 of a construction similar to those provided in the heater.

The flashing of the liquid in the evaporating chamber releases vapors corresponding to the percentage of the liquid which is so evaporated. This in turn depends upon the temperature difference between the evaporating chamber and that of the entering liquid. These vapors are continuously withdrawn from the evaporating chamber through a vapor outlet 13 leading to the vapor space of a condenser 14. In this condenser, the vapors are condensed and the resulting condensate is permitted to flow back into the evaporating chamber by reason of the location of the bottom tube plate 15 with respect to the vapor outlet 13. For withdrawing the noncondensible gases from the condenser and the evaporating chamber, there is provided some suitable means such as an ejector 16. By properly proportioning the ejector and the condenser, it will be apparent that they are effective for maintaining in the evaporating chamber any desired temperature and pressure condition. Preferably this is definitely materially lower than the temperature and pressure in the heater 2. In actual practice there may be maintained a temperature of approximately 212° in the heater 2 corresponding to the boiling point of the liquid at atmospheric pressure. In the evaporating chamber there may be maintained a temperature of at least approximately 180°, thereby providing a temperature drop of 30° to which the liquid is subjected in passing from the heater to the evaporating chamber.

If the liquid being handled is water, each pound of water entering the evaporating chamber will give up 30 B. T. U's. This would effect the evaporation of slightly less than 3% of the total volume of liquid being treated and is sufficient to effect the removal of substantially all of the dissolved air. This air-free liquid may be withdrawn from the evaporating chamber and conducted to a point of use without contamination with the air, by a suitable service connection 17.

The condensing water for the condenser 14 may be supplied through an inlet 18 having a controlling valve 19 automatically operated by a float 20 in the liquid space of the condenser provided in the upper header. In this manner, a constant level of condensing water may be maintained in the condenser. The condenser may also be provided with any usual form of blow off 21.

In accordance with the present invention, it is desired to utilize the heat released in the evaporating chamber for evaporating a portion of the condensing water supplied to the condenser 14. This may be accomplished in accordance with this invention by maintaining in the liquid space of the condenser 14 a temperature which is definitely materially lower than the temperature in the evaporating chamber. This result may be accomplished by providing a connection 22 leading from the liquid space of the condenser 14 to the vapor space of a second condenser 23. The condenser 23 is in turn provided with suitable means, such as an ejector 24 by means of which the desired temperature and pressure conditions may be maintained in the liquid space of the condenser 14. In actual practice, if the temperature in the evaporating chamber is 180°, it may be desired to maintain in the vapor space of the condenser 23, and thereby in the liquid space of the condenser 14, a temperature of 150°. This would provide a temperature gradient of 30° between the temperature of the vapor released in the evaporating chamber and the temperature in the liquid space of the condenser 14.

Assuming that 10,000 pounds of liquid, for example water, per hour is passing through the heater 2 and the evaporating chamber 8, and assuming no loss for radiation, there would be released in the evaporating chamber 300,000 B. T. U's per hour. As there is a 30° difference in temperature between the vapor and liquid sides of the condenser 14, the condensing liquid in the condenser 14 would necessarily absorb 300,000 B. T. U's per hour. This would effect the evaporation of less than 3%, about 2.79%, of 10,000 lbs. of water per hour or approximately 279 lbs. of water per hour. This in turn would be condensed in the condenser 23 from which the condensate as distilled water could be drawn off through a suitable outlet 25.

Under the above conditions, the liquid to be treated might be supplied to the condenser 23 through the inlet 26 at a temperature of 90°, whereby it would leave the condenser and pass to the inlet connection 4 of the heater 2 at a temperature of approximately 120°.

With an apparatus of the above character, it is possible to continuously produce air-free water and withdraw the same for use as required. At the same time, the heat released in the evaporating chamber is effective for evaporating a portion of the condensing liquid in the condenser 14 whereby this condenser serves as an evaporator. The vapor so released in this evaporator-condenser 14 is in turn condensed in the condenser 23 which is effective for recovering the heat of the vapors and in turn imparting this recovered heat to the liquid to be treated before it passes to the heater.

In actual power plant practice, the liquid used for condensing the vapors in the condenser 23 might be drawn from the hot well of the main power plant condenser, or from any other available source.

In Figure 2 there is illustrated a slightly modified form of the apparatus illustrated in Figure 1, the purpose of this construction being to provide increased evaporation within the evaporator-condenser. For sake of convenience and conciseness of description, the parts of this figure corresponding to the parts already described are designated by the same reference characters having a prime affixed thereto. In this construction, it will be noted that the bottom plate 15' of the evaporator-condenser 14' is lowered whereby the condensate formed within the condenser is not permitted to drain back into the evaporating chamber 8' but is conducted to a suitable point by a drip 27. This arrangement is preferable for the reason that in this form of my invention there is supplied to the evaporator-condenser supplemental heat in the form of vapors which are not air free. It will be obvious, therefore, that it would be undesirable to contaminate the air-free liquid in the evaporating chamber 8' by conducting thereto a condensate having dissolved air therein.

For supplying this additional heat to the evaporator-condenser 14', there is provided an additional evaporator 28 having an inlet 29 for heating steam. The supplemental evaporator also has a water inlet 30 similar to the inlet 18' for the evaporator-condenser and controlled by a float-operated valve 31 and float 32. This supplemental evaporator may also be formed with a condensate drip 33 and with a blow-off connection 34.

It will be apparent that by independent steam supplied to the supplemental evaporator, any desired percentage of the liquid supplied thereto may be evaporated. The released vapors may then be conducted by the vapor conduit 35 to the vapor space of the evaporator-condenser 14' for augmenting the heating action of the heat released in the evaporating chamber. Preferably there will be maintained in the supplemental evaporator a pressure substantially equal to the pressure maintained in the evaporating chamber 8' whereby the steam or vapor passing from the supplemental evaporator into the evaporator-condenser will enter the same at the temperature of the vapor space of the evaporator-condenser. The evaporator-condenser will therefore be effective for recovering the combined heat released in the supplemental evaporator and in the evaporating chamber. This will permit an increased amount of liquid to be evaporated in the evaporator-condenser and condensed in the condenser 23' whereby greater quantities of distilled water may be obtained. In certain cases this is desirable because of the fact that in ordinary operating conditions of the deaerating apparatus it is not feasible to release in the evaporating chamber an amount of heat sufficient to evaporate therein more than 3% of the total amount of water passing therethrough. By adding to the heat released in the evaporating chamber that released in the supplemental evaporator, the amount of liquid evaporated in the evaporator-condenser can be very materially increased and is limited only by the capacity of the condenser 23'.

The advantages of the present invention arise from the provision of combined method and apparatus for deaerating and evaporating liquid having desirable features both as a deaerator and an evaporator permitting the production both of air free liquid and distilled liquid.

Further advantages arise from the provision of an apparatus of this character in which the heat released for effecting deaeration is effectively recovered and utilized for effecting evaporation.

Still further advantages arise from the provision of a deaerating apparatus having means for evaporating a quantity of liquid greater than that quantity which could be evaporated by the amount of heat released in effecting the deaeration.

I claim:

1. In a liquid treating apparatus, a heater having a source of heat and a source of liquid, and having a liquid space for said liquid, an evaporating chamber having connection with said liquid space for receiving heated liquid therefrom, said chamber having a liquid space and a vapor space, a service offtake from the liquid space of said evaporating chamber, a condenser communicating with the vapor space of the evaporating chamber for condensing vapors released therein, means for supplying liquid to said condenser, said condenser having a liquid space, and means for maintaining in the liquid space of said condenser a sufficiently lower boiling temperature than the boiling temperature in said evaporating chamber whereby a portion of the cooling liquid is evaporated.

2. In a liquid treating apparatus, a heater having a source of heat and a source of liquid supply, and having a liquid space for the liquid, an evaporating chamber having connection with said liquid space for receiving heated liquid therefrom, said chamber having a liquid space and a vapor space, a condenser communicating with the vapor space of the evaporating chamber for condensing vapors released therein, said condenser having a liquid space, means for supplying cooling liquid to the liquid space of the condenser and means for maintaining in the liquid space of the condenser a sufficiently lower boiling temperature than the boiling temperature in the evaporating chamber to ensure evaporation of a portion of the cooling liquid, said last-mentioned means collecting and condensing such evaporated portion of the cooling liquid.

3. In a liquid treating apparatus, a heater having a source of heat and a source of liquid, and having a liquid space for such liquid, an evaporating chamber in communication with the liquid space of the heater for receiving heated liquid therefrom, said evaporating chamber having a liquid space and a vapor space, a condenser communicating with the vapor space of the evaporating chamber for condensing vapors released therein, said condenser having a liquid space, a service connection from the liquid space of said evaporator, means operable in accordance with demands on said service connection for controlling the supply of liquid to said heater, means for supplying cooling liquid to the liquid space of said condenser, and means for maintaining in said last-mentioned liquid space a sufficiently lower boiling temperature than the boiling temperature in the evaporating chamber to ensure evaporation of a portion of the cooling liquid, said last named means collecting and condensing such evaporated portion of the cooling liquid and recovering the heat thereof.

4. In a liquid treating apparatus, a heater having a source of heat and a source of liquid supply, and having a liquid space for such liquid, an evaporating chamber having connection with the liquid space of the heater for receiving heated liquid therefrom, said evaporating chamber having a liquid space and a vapor space, a condenser communicating with said vapor space, said condenser having a liquid space, means for supplying cooling liquid to the liquid space of the condenser, and means maintaining in the liquid space of the condenser a sufficiently lower boiling temperature than the boiling temperature in the evaporating chamber whereby a portion of the cooling liquid is evaporated, said last named means collecting and condensing such evaporated portion of the cooling liquid and imparting the heat thereof to the liquid supplied to the heater.

5. In a liquid treating apparatus, a heater, an evaporating chamber receiving heated liquid therefrom, and provided with a vapor space, a condenser communicating with said vapor space and having a liquid space, means for supplying cooling liquid to said liquid space, other means for supplying heat to the condenser, and means for maintaining in said liquid space a boiling temperature lower than the boiling temperature in the evaporating chamber.

6. In apparatus for deaerating liquid, an evaporating chamber having a liquid space and a steam space, a service connection leading from the liquid space of said evaporating chamber to convey in a continuous manner substantially air-free liquid therefrom, means for supplying liquid to the evaporating chamber and passing the liquid in a divided state through the steam space of said chamber, the liquid feeding means operating substantially wholly in accord with the demands of said service connection, a condenser connected to the vapor space of the evaporating chamber and arranged to withdraw air and vapor therefrom, said condenser having a liquid space, means for withdrawing air from the condenser, the evaporating chamber being closed against inlet of free air, and means for maintaining in the liquid space of said condenser boiling temperature lower than the boiling temperature in the evaporating chamber.

7. In apparatus for deaerating liquid, an evaporating chamber having a liquid space and a vapor space, a service connection leading from the liquid space of said evaporating chamber to convey substantially air-free liquid therefrom, automatic means for supplying to said evaporating chamber substantially wholly in accord with the demands of said service connection liquid which is at a temperature higher than the temperature in said evaporating chamber and which has a substantially constant difference in temperature thereover, means including a condenser connected to said evaporating chamber for maintaining said substantially constant difference in temperature, said condenser having a liquid space, and means for maintaining in the liquid space of said condenser a boiling temperature lower than the boiling temperature in said evaporating chamber.

8. In a liquid treating apparatus, a condenser having a liquid space and a vapor space, means for supplying a condensing liquid thereto, means including a second condenser for maintaining a temperature in the liquid space of said first-mentioned condenser lower than that maintained in the vapor space thereof, and a plurality of independent means for supplying heat to the vapor space of said first-mentioned condenser.

9. In a liquid treating apparatus, a condenser having a liquid space and a vapor space, means for supplying a condensing liquid thereto other than the liquid being treated, means for maintaining a temperature in the liquid space of said condenser materially lower than that maintained in the vapor space thereof, means for supplying heat to the vapor space of said condenser for evaporating a portion of its condensing liquid, and means for utilizing the heat of the vapor produced in the liquid space of said condenser for preheating the liquid supplied to said apparatus.

10. In apparatus for deaerating liquid, a receiver having a liquid space and a steam space, a connection leading from the liquid space of said receiver to convey substantially air-free liquid therefrom to a point of utilization of such liquid, and means for supplying to said receiver substantially wholly in accord with the demands of said connection a liquid which is at a temperature higher than the temperature in said receiver and which has a substantially constant difference in temperature thereover, a surface condenser connected to said receiver for maintaining said substantially constant difference in temperature, said surface condenser having a liquid space and means for maintaining in the liquid space of said condenser a definitely lower boiling temperature than the boiling temperature in said receiver whereby a portion of the condensing liquid is evaporated.

11. In a liquid treating apparatus, a receiver having an air outlet, means for supplying heat and liquid to said receiver, with the heat of such amount as to change the phase of said liquid to a percentage sufficient to release substantially all of the air contained therein, a surface condenser for recovering at least a portion of the heat released in the receiver, said surface condenser having a liquid space, a closed conduit for conveying substantially air-free water from the receiver to a point of utilization of such liquid, and means for maintaining in the liquid space of said condenser a definitely lower boiling temperature than the boiling temperature in said receiver whereby a portion of the condensing liquid is evaporated.

12. In the method of treating liquid for the removal of air and gases therefrom, the steps consisting in heating the liquid, passing the same to an evaporator, maintaining conditions in the evaporator whereby the percentage rate of evaporation is substantially constant irrespective of the volume of liquid being treated, utilizing the heat of the vapors released in the evaporator for evaporating a percentage of an independent body of liquid, and utilizing the heat of such percentage for preheating the liquid being treated.

13. The method of treating liquids for the removal of air and gases contained therein, which consists in introducing the liquid into a chamber, distributing the liquid in said chamber, continuously maintaining in said chamber pressure and temperature conditions such as to change the phase of said liquid to a percentage sufficient to release substantially all of the air contained therein, conveying the substantially air-free liquid from said chamber to a point of utilization thereof, utilizing the heat released in said chamber for evaporating a percentage of an independent body of liquid, and recovering the heat produced by the evaporation of such percentage.

14. The method of deaerating liquid, comprising passing the liquid to be deaerated successively through a condenser, a heater and into a receiver, maintaining conditions within said receiver to cause a change of phase of the liquid to a percentage sufficient to release substantially all of the air contained therein, withdrawing substantially air-free liquid from the receiver and conveying the same to a point of utilization of such liquid, utilizing the heat released within said receiver to evaporate a percentage of an independent body of liquid, and passing the vapors produced by such evaporation to said condenser.

15. The method of deaerating liquid, comprising providing a receiver having a liquid space and a steam space, conveying substantially air-free liquid from the liquid space to a point of utilization of such liquid, supplying to said receiver liquid and heat, feeding the entering liquid into the steam space of the receiver, continuously passing the air and vapor released in said receiver to a surface condenser having a liquid space and a vapor space, and continuously maintaining in the liquid space of said surface condenser a boiling temperature definitely lower than the boiling temperature in the steam space of said receiver whereby a portion of the condensing liquid is evaporated.

16. In a liquid treating apparatus, a heater having a liquid space and having a source of heat and a source of liquid, an evaporating chamber having connection with the liquid space of the heater for receiving heated liquid therefrom, said evaporating chamber having a liquid space and a vapor space, a condenser communicating with the vapor space only of the evaporating chamber for condensing the vapors released therein, means for supplying to said condenser condensing liquid other than the liquid from the said evaporating chamber, and means for maintaining in the liquid space of said condenser a lower pressure than the pressure in said evaporating chamber.

17. In a liquid treating apparatus, a heater having a liquid space and having a source of heat and a source of liquid, an evaporating chamber having connection with the liquid space of the heater for receiving heated liquid therefrom, said evaporating chamber having a liquid space and a vapor space, a condenser communicating with the vapor space only of the evaporating chamber for condensing the vapors released therein, means for supplying to said condenser condensing liquid other than the liquid from the said evaporating chamber, means for maintaining in the liquid space of said condenser a lower pressure than the pressure in said evaporating chamber, and means for controlling the supply of condensing liquid in accordance with the amount of condensing liquid evaporated.

18. In the method of treating liquids, the steps consisting of supplying the liquid to a deaerating chamber, withdrawing the deaerated liquid therefrom and delivering it to a point of use, withdrawing the vapors from said chamber and utilizing the same to effect evaporation of another body of liquid, and collecting the vapors produced by such evaporation and supplying the heat thereof to the liquid to be treated.

19. In a deaerating apparatus, a heater constituting a temperature stage, a receiver constituting a pressure stage, means for supplying liquid successively to said stages, a surface condenser communicating with the pressure stage for withdrawing vapors therefrom, and means for maintaining in the liquid space of said condenser a pressure lower than the pressure in said pressure stage.

20. In a deaerating apparatus, a heater constituting a temperature stage, a receiver constituting a pressure stage, means for supplying liquid successively to said stages, a surface condenser communicating with the pressure stage for withdrawing vapors therefrom, and means for maintaining in the liquid space of said condenser a pressure lower than the pressure in said pressure stage, said means comprising a second condenser.

21. In a deaerating apparatus, a heater constituting a temperature stage, a receiver constituting a pressure stage, means for supplying liquid successively to said stages, a surface condenser communicating with the pressure stage for withdrawing vapors therefrom, and means for maintaining in the liquid space of said condenser a pressure lower than the pressure in said pressure stage, said means comprising a second condenser, said second condenser having connections for passing therethrough the liquid to be supplied to said stages.

In testimony whereof I have hereunto set my hand.

WILLIAM S. ELLIOTT.